Sept. 25, 1928.  
H. M. FUNNELL  
1,685,528  
SPRING RETAINED CASING FOR UNIVERSAL JOINTS  
Filed April 4, 1927

HARRY MAWSON FUNNELL  
INVENTOR

HIS ATTORNEY

Patented Sept. 25, 1928.

1,685,528

UNITED STATES PATENT OFFICE.

HARRY MAWSON FUNNELL, OF NEW MARKET, NEW JERSEY.

SPRING-RETAINED CASING FOR UNIVERSAL JOINTS.

Application filed April 4, 1927. Serial No. 180,796.

My invention relates to spring retainers for encased universal joints where two casings are held together in operating position by the action of a spring so that any wear of the packing in the casings is readily compensated, and has for its object the production of a spring that will cooperate with either the driving or driven member of the encased universal joint to hold the casings in operative relation and provide a self locking means to prevent centrifugal force from disengaging the spring from its locked position.

The foregoing and other features of my invention will now be described in connection with the accompanying drawings forming part of this specification in which I have represented my spring retained casing in its preferred form after which I shall point out more particularly in the claims those features which I believe to be new and of my own invention.

In carrying out my invention, I employ a universal joint member 10 provided with a groove 11 formed in the hub thereof. The member 10 may be either the driving or driven member.

Covering the universal joint I provide two casings 20 and 21 which may be of any design to cover the joint and move along the line 22 to accommodate the movement of the joint. These casings are held together by the action of spring 30.

Figure 1:
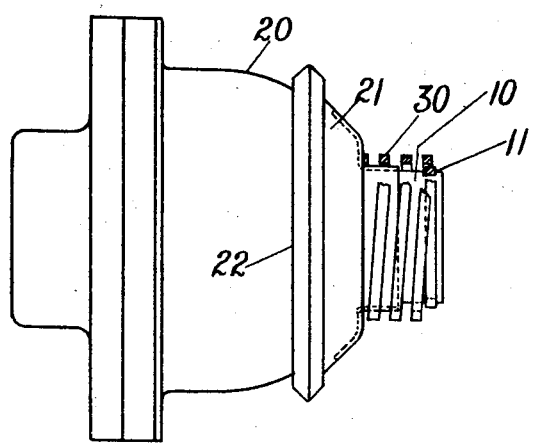
Figure 1 is a side elevation of my spring retained casing shown mounted on a universal joint of well known construction.
Figure 2:
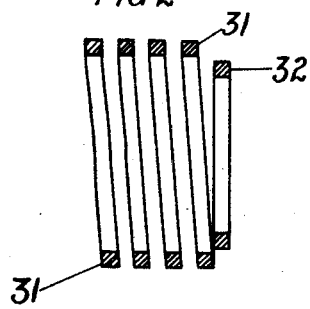
Figure 2 is a detailed view of my spring in part section.
Figure 3:
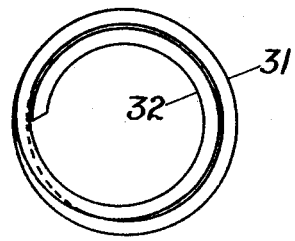
Figure 3 is an end view of my spring, looking from the right of Figure 2.
Figure 4:
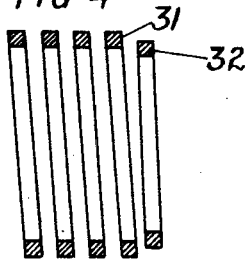
Figures 4 and 5 illustrate a modified form of my spring employed.
Figure 5:
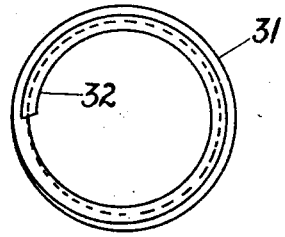

My spring is preferably made of square section wire but any section may be used and has a number of coils of equal diameter 31 with the end coil 32 somewhat smaller in diameter. This reduced portion of the spring is adapted to fit into the groove 11 of the joint member and embrace the groove. When the spring is made as shown in Figure 2, with the outside diameter of coil 32 smaller than the inside of coils 31 as soon as it is in place the compression of the spring forces the coil 31 adjacent the coil 32 over the top of the coil which is in the groove thereby locking it securely in place as shown in Figure 1.

With the construction shown there is no spring retainer used and no special tools are required for assembly. The casings are placed in position over the joint and the spring coil 32 snapped into the groove 11 in the yoke 10 provided for the purpose and the assembly is complete.

It has been found by experience that end coils of springs will open up due to the actions of centrifugal force at high speed and my construction wherein the second coil is over the first coil in the groove provides a much greater resistance to this action.

I wish it distinctly understood that my spring retained casing for universal joints herein described and illustrated is in the form in which I desire to construct it but that changes or variations may be made as may be convenient or desirable without departing from the salient features of my invention and I therefore, intend the following clauses to cover such modifications as naturally fall within the lines of invention.

I claim:—

1. A device of the class described a shaft provided with an annular groove extending around the shaft, a coiled spring adapted to freely function on the shaft and having one end coil smaller than the diameter of the effective portion of the spring so that when the reduced end coil engages the groove it is held therein by the radial compression of the end coil and additionally secured by the adjacent coil when the spring is under compression.

2. The device of claim 1 in which the groove forms a thrust shoulder of smaller diameter than the diameter of the effective portion of the spring.

3. The device of claim 1 in which the spring forms its own locking and thrust members.

4. The device of claim 1 in which one end coil of the spring is formed for radial compression and the effective portion of the spring formed for longitudinal compression.

In testimony whereof I affix my signature.

HARRY MAWSON FUNNELL.